April 6, 1954     W. R. BRAUN, SR     2,674,352
HYDRAULIC BRAKE SYSTEM
Filed Feb. 7, 1951     2 Sheets-Sheet 1
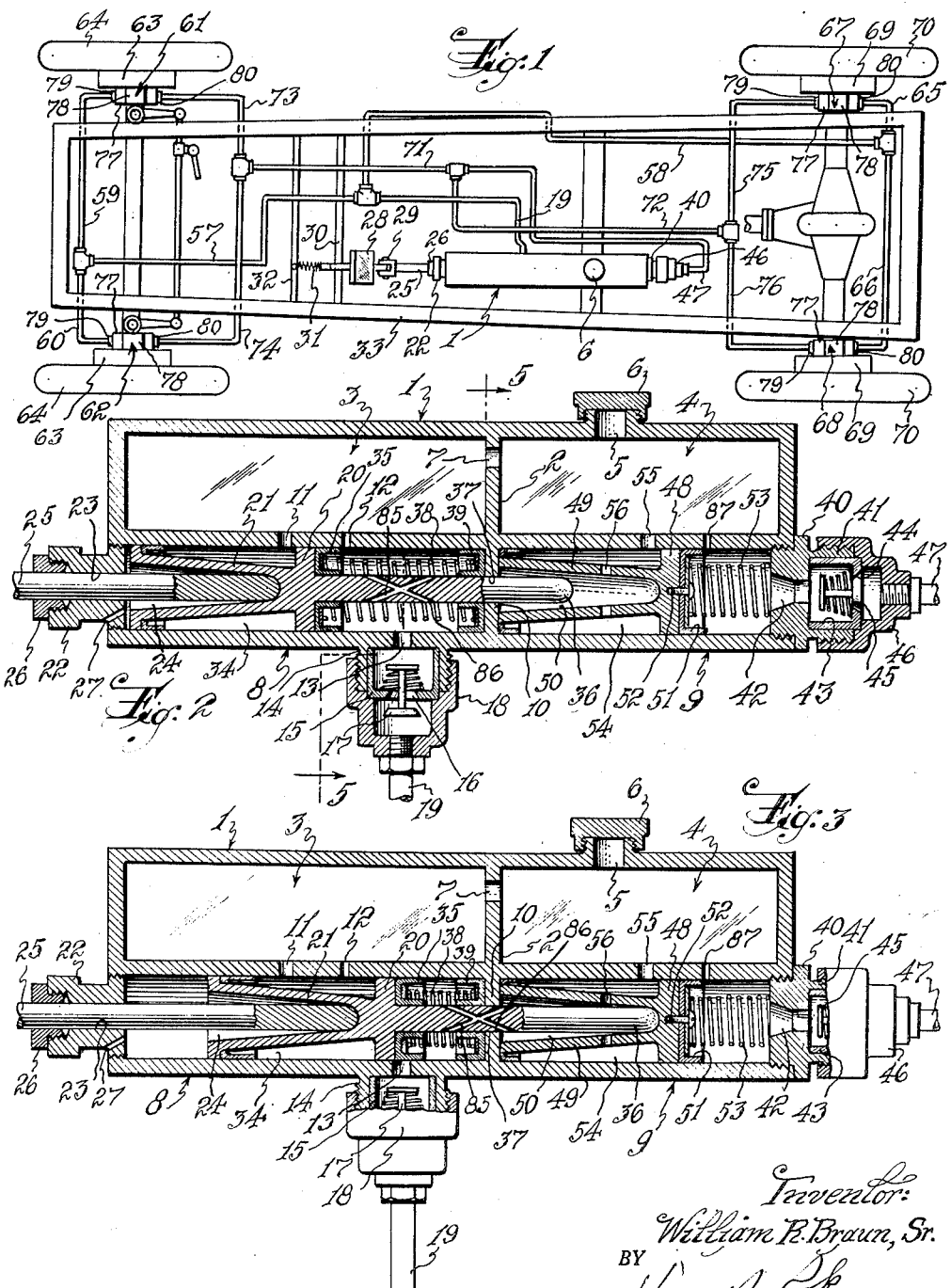
Inventor:
William R. Braun, Sr.
BY Harry Cook
Attorney.

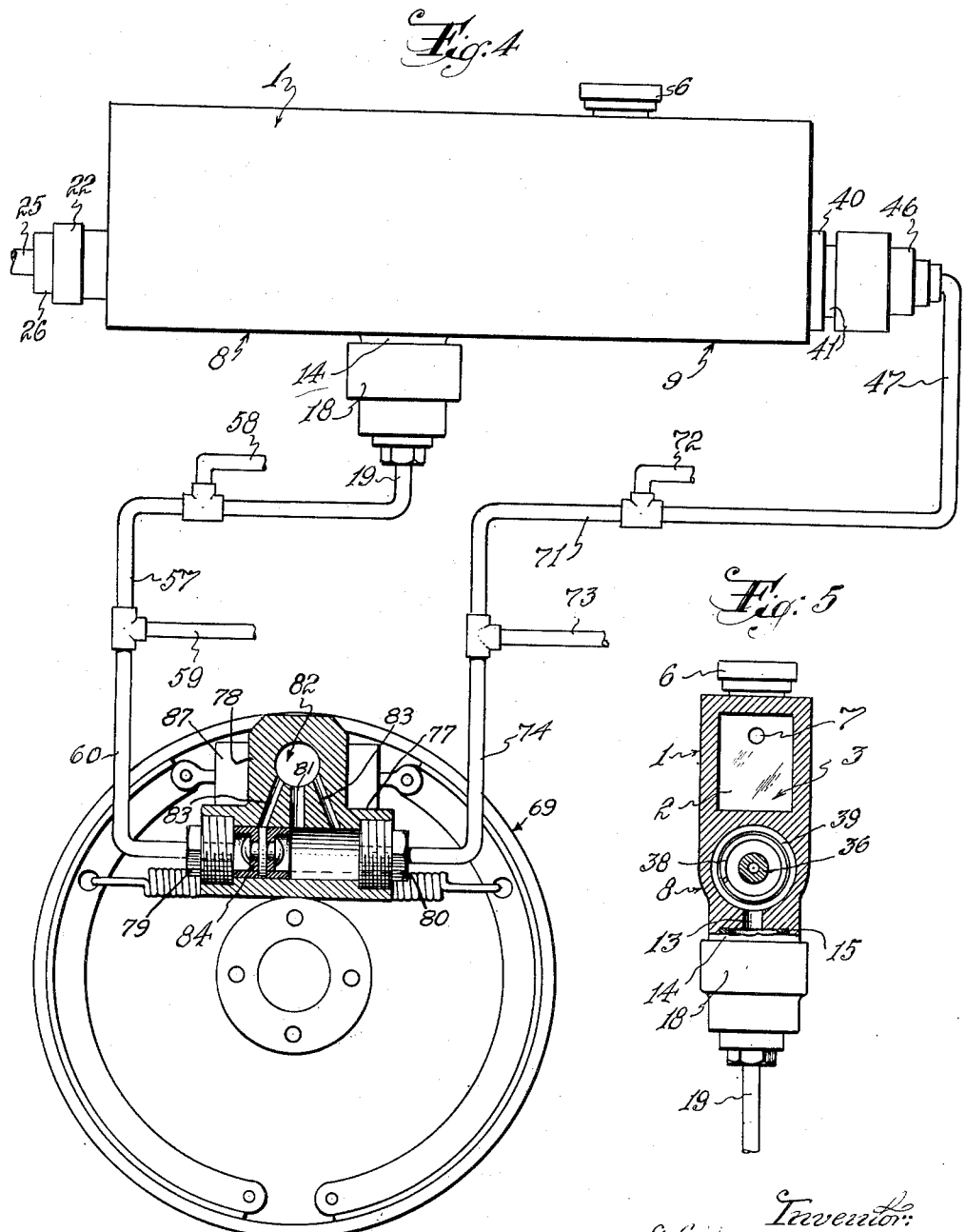

Patented Apr. 6, 1954

2,674,352

UNITED STATES PATENT OFFICE 2,674,352

HYDRAULIC BRAKE SYSTEM

William R. Braun, Sr., North Arlington, N. J.

Application February 7, 1951, Serial No. 209,845

10 Claims. (Cl. 188—152)

This invention relates to fluid pressure braking systems for motor vehicles.

A prime object of the present invention is to provide a braking system for a motor vehicle wherein each wheel has a brake and a fluid pressure actuated motor or piston and cylinder device associated therewith for actuating the corresponding brake, in combination with two fluid pressure producing systems each for supplying fluid pressure to all of said fluid pressure actuated motors and a check cylinder and valve connected between each fluid pressure actuated motor and the pipes from both of said fluid pressure systems, so that one of said fluid pressure systems normally actuates the service brakes of the vehicle and the other fluid pressure system actuates said brakes in the event of failure of the first-mentioned system due to leakage or breakage therein, and the check cylinder and valve prevents the flow of fluid from either of said fluid pressure systems into the other during operation of the brakes.

Another object of the invention is the provision in a hydraulic braking system employing two separate fluid pressure systems, one of which is for emergency purposes, of novel means by which a single manually actuated operating member when moved in one direction operates one system to effect the setting of all of the brakes of the vehicle, but in case of said brakes failing to operate effectively through said system, the operating member will by continued movement in the same direction effect the application of the emergency system for operating the brakes.

Another object of the invention is to provide a novel braking system which is simple in construction, highly efficient in operation, relatively cheap to make and install, has relatively few parts and is strong and not likely to get out of order.

Broadly, the invention consists in the provision of a braking system having two master cylinders, each of which operates the four brakes of the vehicle. One cylinder controls the flow of fluid through the normal line to the brakes and the other cylinder, however, controls the flow of fluid to the brakes through an emergency line. The pistons of the respective master cylinders are operated by a single foot pedal.

The invention will be better understood from the description thereof to follow taken in connection with the accompanying drawings in which—

Figure 1 is a plan view of a hydraulic braking system embodying my invention as applied to an automobile, portions of which are shown;

Figure 2 is an enlarged vertical sectional view of the master cylinders and associated parts, the parts being shown in inoperative position.

Figure 3 is a similar view but showing the parts moved to a position preparatory to emergency operation of the system.

Figure 4 is an enlarged fragmentary part elevational and part diagrammatic view showing the master cylinder structure connected to a wheel cylinder, the latter being shown in section.

Figure 5 is a vertical sectional view taken on the plane of the line 5—5 of Figure 2.

Referring to the drawings in detail, the braking system includes an elongated reservoir 1 divided by a partition wall 2 into two compartments 3 and 4. Compartment 4 is formed with a filling opening 5 which may be closed by a removal cap 6. Communication between the two compartments is provided by an opening 7 through the partition wall 2.

A main master cylinder 8 is formed underneath the compartment 3 and a similar auxiliary master cylinder 9, shorter in length, is formed underneath the compartment 4, a partition wall 10 separating the two cylinders, each cylinder comprising a part of one of two fluid pressure systems.

The cylinder 8 is formed with a filling port 11 and a compensating port 12, both leading to the compartment 3 and with a discharge port 13. An integral screw-threaded tubular extension 14 is formed on the cylinder around the discharge port 13 and this extension forms a seat for a cup-shaped member 15. The cup-shaped member has an opening 16 in its base for slidably supporting a spring-pressed valve member 17 for controlling the discharge port 13. A coupling member 18 is mounted on the extension and provides a connection between the extension and a fluid pressure delivery pipe or conduit 19.

A compression piston, having a head portion 20 and a skirt portion 21, reciprocates in the cylinder 8 and is retained against displacement by a removable plug or head member 22 closing the outer open end of the cylinder and having an axial opening 23. The skirt portion 21 is formed with an elongated tapered central recess 24 for the reception of one end of a thrust or push rod 25 extending through the axial opening 23 in the plug member. A gasket 26 seals the junction between the outer end of the plug and the rod. The plug member may be provided with a port 27 for the escape of fluid.

The push rod 25 is pivotally connected to a foot pedal lever 28 as indicated at 29, the pedal lever being pivoted on a suitable support 30. A conventional retractile spring 31 connects the pedal lever to a fixed support 32 on the chassis 33. Thus it will be seen that by this connection between the pedal lever and the piston the piston will be moved when the pedal is actuated.

The skirt portion 21 of the piston tapers inwardly from its outer end towards the head portion 20 thereby providing in conjunction with the wall of the cylinder an annular chamber 34 at the rear of the head portion and this chamber is in constant communication with the compartment 3 of the reservoir through the filling port 11.

The head portion 20 of the piston carries a packing cup 35 and when the piston is in its retracted position this packing cup uncovers the compensating port 12 for permitting free communication in both directions between the cylinder 8 and the compartment 3. The forward face of the piston head 20 is formed with an integral, elongated extension rod 36 which normally extends through an opening 37 in the partition wall 10 and into the cylinder 9. A spiral spring 38 encircles the extension rod 36 and has one end seated in the packing cup 35 and its other end in a packing cup 39 positioned against the wall 10. The spring normally holds the piston against forward compressive motion and the cups against displacement and also assists in returning the piston to its retracted position.

The auxiliary master cylinder 9 has an open outer end closed by a plug or head member 40 having a tubular extension 41. The plug member is formed with an axial opening forming a discharge port 42 which leads to the opening in the plug extension. A cup-shaped member 43 is mounted in the recess and has a central opening 44 in its base for slidably supporting a spring-pressed valve member 45. A coupling 46 threaded on to the plug extension provides a connection between the discharge port 42 and a fluid pressure delivery pipe 47.

A dependent compression piston reciprocates in the cylinder 9 and is constructed similarly to the piston in cylinder 8 having a head portion 48 and a skirt portion 49, the latter having an elongated recess 50. A packing cup 51 is fastened to the face of the head portion by a screw 52. The cup provides a seat for a spiral spring 53, the other end of the spring seating against the inner face of the plug member 40. The skirt portion of the piston is tapered and reduced in cross section to provide in conjunction with the wall of the cylinder 9 an annular chamber 54 communicating by way of a filling port 55 in the cylinder wall with the compartment 4 of the reservoir. Ports 56 in the skirt portion of the piston provide free communication between the recess 50 and the annular chamber 54 for the passage of the fluid during the retraction stroke of the piston.

The delivery pipe 19 connects with a branch pipe 57 leading to the front of the vehicle and with a branch pipe 58 leading to the rear thereof. Pipe 57 has branches 59 and 60 connected to one end of check cylinders 61 and 62, respectively, mounted on the brake drums 63 of the brakes of the front wheels 64. Pipe 58 connects with branch pipes 65 and 66 communicating with one end of check cylinders 67 and 68, respectively, mounted on the drums 69 of the brakes of the rear wheels 70.

The delivery pipe 47 connects with a branch pipe 71 leading to the front of the vehicle and with a branch pipe 72 leading to the rear thereof. Pipe 71 has branches 73 and 74 connected to the other end of the cylinders 61 and 62, respectively. Pipe 72 connects with branch pipes 75 and 76 connected to the other end of cylinders 67 and 68, respectively.

The check cylinders 61, 62, 67 and 68 are similarly constructed and as shown in Figure 4 each comprises a cylindrical tubular body 77 with an integral extension 78 above the top wall of the body. A threaded annular plug 79 having an axial bore closes one end of the cylinder and a similar plug 80 closes the other end. A central discharge port 81 leads to a central passage 82 in the extension 78. On each side of the discharge port is a compensating port 83.

A floating compression piston 84 reciprocates in the cylinder and is prevented from displacement therein by the end plugs. The end of one of the branch pipes from the normal pipe line 19, for example, pipe 60 is connected to the axial bore in plug 79 and the end of one of the branch pipes from the emergency pipe line 47, for example, pipe 74 is connected to the axial bore of the other plug 80.

The passage 82 of the extension 78 of each check cylinder opens into an ordinary fluid pressure actuated motor or wheel cylinder 87 associated with each brake drum so that the fluid forced through said passage under pressure operates the motor which in turn actuates friction elements or shoes of the brake drum of the wheel. A retractile spring returns the friction elements when pressure is released. Such a fluid motor or wheel cylinder and associated parts is disclosed in Patent 2,324,007.

In normal operation, when the operator depresses the foot pedal lever 28 to apply the brakes, force is transmitted from this lever through the rod 25 to the piston in the main master cylinder 8 resulting in moving the piston on its compression stroke. During the initial movement of the piston on its compression stroke the packing cup 35 on the head of the piston closes the compensating port 12 in the cylinder and pressure is imposed on the fluid in the cylinder 8 forward of the piston head, resulting in the discharge of fluid from the cylinder through the discharge port 13, past the unseated valve 17 and through the delivery pipe 19 and its branches to the check cylinders 62, 63, 67 and 68 and from said check cylinders through their passages 82 to the fluid pressure motors or wheel cylinders, causing energization of the fluid motors or wheel cylinders with the resultant spreading of the friction elements or shoes into braking engagement with the brake drums of the wheels.

The movement of the piston in cylinder 8 is such as to equalize pressures in the various branches leading to the brakes to the end that the brakes associated with the wheels may be applied with equal force and effect.

Upon release of the applied force on the foot pedal lever 28, the lever returns to its normal or retracted position under the influence of the retractile spring 31. As the foot pedal lever returns to its normal position, the push rod 25 is retracted, resulting in the release of the piston in the cylinder 8 whereupon said piston moves to its retracted position under the influence of the spring 38.

If a leak or break occurs in the normal fluid line or system, the fluid will escape through said leak or break and no braking effect is produced upon depression of the foot pedal lever. According to the present invention, however, in such case, the depression of the foot pedal lever will through the rod 25 move the piston in cylinder 8 forwardly until its packing cup 35 closes the discharge port 13 in the cylinder. At the same time, the extension rod 36 is carried forward into the cylinder 9 and through the recess 49 in the skirt portion of the piston in said cylinder and into engagement with the head portion 48 of the piston as shown in Figure 3. When the extension rod is thus in engagement with the head portion of the piston, compensating ports 85 and 86 formed in the extension rod 36 are positioned in the opening 37 in the partition wall 10 permitting the fluid from cylinder 8 to circulate and pass into the recess 50 of the piston skirt portion in cylinder 9 and through ports 56 into the chamber 54 in the cylinder to permit movement of the piston 20 after it has closed port 13 as shown in Fig. 3. Continued pressure on the foot pedal lever will cause the extension rod 36 to force the piston in cylinder 9 forwardly on its compression stroke against the action of spring 53. During this compression stroke, the packing cup 51 will close the compensating port 87 in the wall of cylinder 9 and pressure is imposed on the fluid forward of the piston head 48 resulting in the discharge of fluid through the discharge port 42, past the unseated valve 45 and through the delivery pipe 47 and its branches to the check cylinders 61, 62, 67 and 68. From the check cylinders the fluid passes to the pressure motors or wheel cylinders of the wheels for operating the brakes of the wheels.

When pressure on the foot pedal lever is released, the pistons in cylinders 8 and 9 will be returned to normal retracted position by the springs 38 and 53, respectively.

Thus it will be seen that I have provided a hydraulic braking system whereby fluid is supplied to the brakes of the four wheels of the vehicle either under normal or emergency conditions thereby ensuring effective braking under all conditions.

Changes in details of construction might be made without departing from the principle of the invention.

What I claim is:

1. A hydraulic braking system for a motor vehicle, comprising braking devices for all of the wheels of the vehicle, a main master cylinder having a pressure producing piston, manual means for actuating said piston, an auxiliary master cylinder independent of said main master cylinder having a pressure producing piston, conduit means for placing the main master cylinder in communication with all of said braking devices, conduit means for placing the auxiliary master cylinder in communication with all of said braking devices, and a lost motion means of connection between said pistons whereby upon a failure of the piston in said main master cylinder to develop fluid pressure, said latter piston upon traveling a predetermined distance in its compression stroke will initiate movement of the piston in the auxiliary master cylinder for developing pressure therein which pressure will be transmitted through its associate conduit means to the braking devices.

2. A hydraulic braking system for a motor vehicle including braking devices for all of the wheels of the vehicle, a main master cylinder having a pressure producing piston and having a valve controlled discharge port, manual means for actuating said piston, an auxiliary master cylinder independent of said main master cylinder having a pressure producing piston and having a valve controlled port, conduit means associated with the discharge port in the main master cylinder for placing said main cylinder in communication with the braking devices, conduit means associated with the discharge port of the auxiliary cylinder for placing said auxiliary cylinder in communication with the braking devices, and a lost motion means of connection between said pistons whereby upon a failure of the piston in said main master cylinder to develop fluid pressure, said latter piston upon traveling a predetermined distance in its compression stroke will initiate movement of the piston in the auxiliary master cylinder for developing pressure therein which pressure will be transmitted through its discharge port and associated conduit means to the braking devices.

3. A hydraulic braking system for a motor vehicle including braking devices for all of the wheels of the vehicle, a main master cylinder having a pressure producing piston and having a valve controlled discharge port, manual means for actuating said piston, an auxiliary master cylinder coaxial with but independent of said main master cylinder and separated therefrom by a partition wall and having a pressure producing piston and a valve controlled port, conduit means associated with the discharge port in the main master cylinder for placing said main master cylinder in communication with the braking devices, conduit means associated with the discharge port in the auxiliary master cylinder for placing said auxiliary cylinder in communication with the braking devices, an extension rod formed on the piston in the main cylinder extending through a hole in said partition wall, and a skirt portion formed on the piston in the auxiliary master cylinder opposite said extension rod having a recess disposed in the path of said extension rod whereby upon travel of the piston in the main cylinder a pre-determined distance in its compression stroke the extension rod carried thereby will engage the piston in the auxiliary cylinder and move the latter piston for developing pressure in said auxiliary cylinder, which pressure is transmitted through its valve controlled port and associated conduit means to the braking devices.

4. A hydraulic braking system as defined in claim 3 characterized by spring means for retracting the pistons in the main and auxiliary cylinders.

5. In a fluid pressure actuating system for applying the brakes to the four wheels of a motor vehicle, braking devices for all of said wheels, a main master cylinder having a discharge port, conduit means associated with said discharge port for placing said main master cylinder in communication with the braking devices, an auxiliary master cylinder disposed in alignment with said main master cylinder and forming an extension thereof, a partition wall between said cylinders formed with a hole therethrough, said auxiliary cylinder having a discharge port, conduit means associated with the discharge port of said auxiliary cylinder for placing said auxiliary cylinder in communication with the braking devices, a piston reciprocable in said main cylinder and having an extension rod formed thereon extending therefrom through the hole in said wall in liquid-tight relation to the wall of said hole and into the auxiliary cylinder, manual means for actuating said piston, a piston reciprocable in said auxiliary cylinder, and a lost motion connection between said extension rod and the piston in said auxiliary cylinder whereby upon the travel of the piston in the main cylinder a predetermined distance in its compression stroke the extension rod will engage the piston in the auxiliary cylinder and move the latter piston for developing fluid pressure in said auxiliary cylinder which pressure is transmitted through its discharge port and associated conduit means to the braking devices.

6. A fluid pressure actuating system as defined in claim 5 characterized by spring means for retracting the pistons in the main and auxiliary master cylinders.

7. A hydraulic braking system for a four wheeled vehicle including braking devices for all of the wheels, a main master cylinder having a fluid pressure producing piston, manual means for actuating said piston, a check cylinder operatively connected to each of said braking devices, pipe lines operatively connecting said main master cylinder with said check cylinders, an auxiliary master cylinder independent of said main master cylinder having a fluid pressure producing piston, pipe lines operatively connecting said auxiliary master cylinder with said check cylinders, and a lost motion means of connection between said pistons whereby upon the travel of the piston in the main cylinder a predetermined distance said latter piston will move the piston in the auxiliary cylinder for developing pressure therein which pressure is transmitted through its associated pipe lines to the braking devices.

8. In a hydraulic braking system for a vehicle, the combination with braking devices for all of the wheels of the vehicle, a reservoir to hold braking fluid for said braking system, a main master cylinder having a discharge port and having a compensating port connecting said master cylinder to said reservoir, an auxiliary master cylinder having a discharge port, a piston reciprocable in said main cylinder and adapted when moved in one direction to force fluid under pressure out of said cylinder through its discharge port, manually operated means for moving said piston in said direction, a piston reciprocable in said auxiliary cylinder, a check cylinder connected to each braking device, fluid conducting means connected with the discharge port in said main cylinder and having branches connected to said check cylinders, fluid conducting means connected with the discharge port in said auxiliary cylinder and having branches connected to said check cylinders, a lost motion means of connection between said pistons and means controlled by the piston in said main cylinder whereby during initial movement of said latter piston on its compression stroke said compensating port in the main cylinder is closed and during continued movement of said main piston the piston in the auxiliary cylinder is connected to said main piston and actuated to produce fluid pressure in the auxiliary cylinder which pressure is transmitted through the discharge port in said auxiliary cylinder and its associated fluid conducting means to the check cylinders and braking devices.

9. A hydraulic braking system for a vehicle defined in claim 8 characterized by spring means for retracting the pistons in both the master cylinders.

10. A hydraulic brake system for a motor vehicle as defined in claim 1 wherein each of said braking devices includes a fluid pressure actuated motor and with the addition of a cylinder and piston device for each of said fluid pressure actuated motors, the cylinders of said piston and cylinder devices being connected at one end to the conduit means for said master cylinder and at their opposite ends to the conduit means for said auxiliary cylinder and with each of the cylinders of said piston and cylinder devices having an outlet intermediate its ends connected to the inlet of the corresponding fluid pressure actuated motor, whereby when fluid is flowing from one of said main or auxiliary master cylinders said piston of the piston and cylinder device will prevent flow of fluid into said conduit of the other main or auxiliary master cylinder.

References Cited in the file of this patent

UNITED STATES PATENTS

| Number | Name | Date |
| --- | --- | --- |
| 1,943,886 | Carroll | Jan. 16, 1934 |
| 1,987,435 | Engel | Jan. 8, 1935 |
| 2,107,111 | Etchison | Feb. 1, 1938 |
| 2,162,114 | Oliver | June 13, 1939 |
| 2,174,615 | Bowen et al. | Oct. 3, 1939 |
| 2,209,343 | Masteller | June 30, 1940 |
| 2,239,751 | Kritzer | Apr. 29, 1941 |
| 2,300,694 | Overbeke | Nov. 3, 1942 |
| 2,409,335 | Von Stackelberg | Oct. 15, 1946 |